United States Patent [19]
McVey et al.

[11] Patent Number: 5,996,940
[45] Date of Patent: Dec. 7, 1999

[54] APPARATUS AND METHOD FOR COMBINED REDUNDANT DEPLOYMENT AND LAUNCH LOCKING OF DEPLOYABLE SATELLITE APPENDAGES

[75] Inventors: Ray E. McVey, El Segundo; Samir F. Bassily, Los Angeles, both of Calif.

[73] Assignee: Hughes Electronics Corporation, El Segundo, Calif.

[21] Appl. No.: 08/888,500

[22] Filed: Jul. 7, 1997

[51] Int. Cl.⁶ .................................................. B64G 1/10
[52] U.S. Cl. .................................... 244/158 R; 244/172
[58] Field of Search ............................. 244/158 R, 173; 343/881, 840, 915, DIG. 2, 880; 74/25, 99 R, 102, 105, 108

[56] References Cited

U.S. PATENT DOCUMENTS

| | | | |
|---|---|---|---|
| 3,397,399 | 8/1968 | Carman et al. | 343/915 |
| 3,707,720 | 12/1972 | Staehlin et al. | 343/840 |
| 3,780,375 | 12/1973 | Summings et al. | 343/915 |
| 4,030,102 | 6/1977 | Kaplan et al. | 244/173 |
| 4,658,265 | 4/1987 | Heinze et al. | 343/915 |
| 4,683,475 | 7/1987 | Luly | 343/915 |
| 4,780,726 | 10/1988 | Archer et al. | 343/840 |
| 5,451,975 | 9/1995 | Miller et al. | 343/915 |

*Primary Examiner*—Galen L. Barefoot
*Attorney, Agent, or Firm*—Georgann S. Grunebach; M. W. Sales

[57] ABSTRACT

An apparatus for deploying a satellite appendage such as an umbrella-like antenna reflector structure is provided. The umbrella-like antenna reflector structure includes a plurality of rib members movable from a stowed configuration to a deployed configuration. The deployment apparatus comprises a deployment tube and a central hub pivotally attached to the plurality of rib members and slidably attached to the deployment tube. The deployment tube is adapted to move along its major axis with respect to the central hub. The deployment apparatus further includes a flexible member connecting the central hub to the deployment tube and a mechanism for tensioning the flexible member. The flexible member can be used to lock the deployment tube, which in turn can be used to lock the umbrella-like structure, in a stowed configuration. Alternatively or additionally, a second flexible member can be used to deploy the deployment tube, which in turn can be used to deploy the umbrella-like structure.

33 Claims, 4 Drawing Sheets

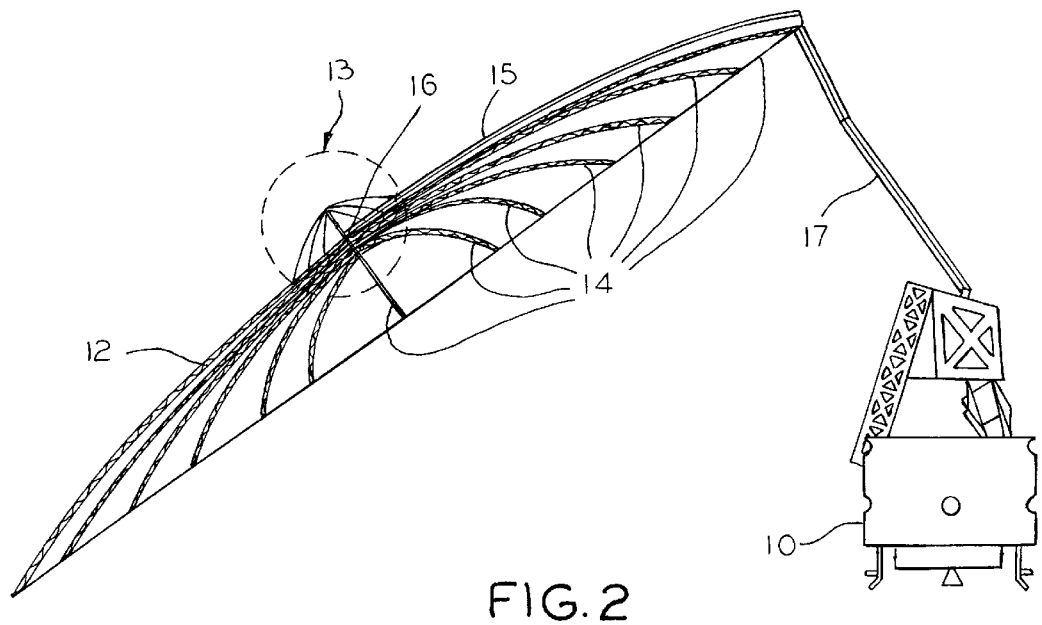
FIG. 2
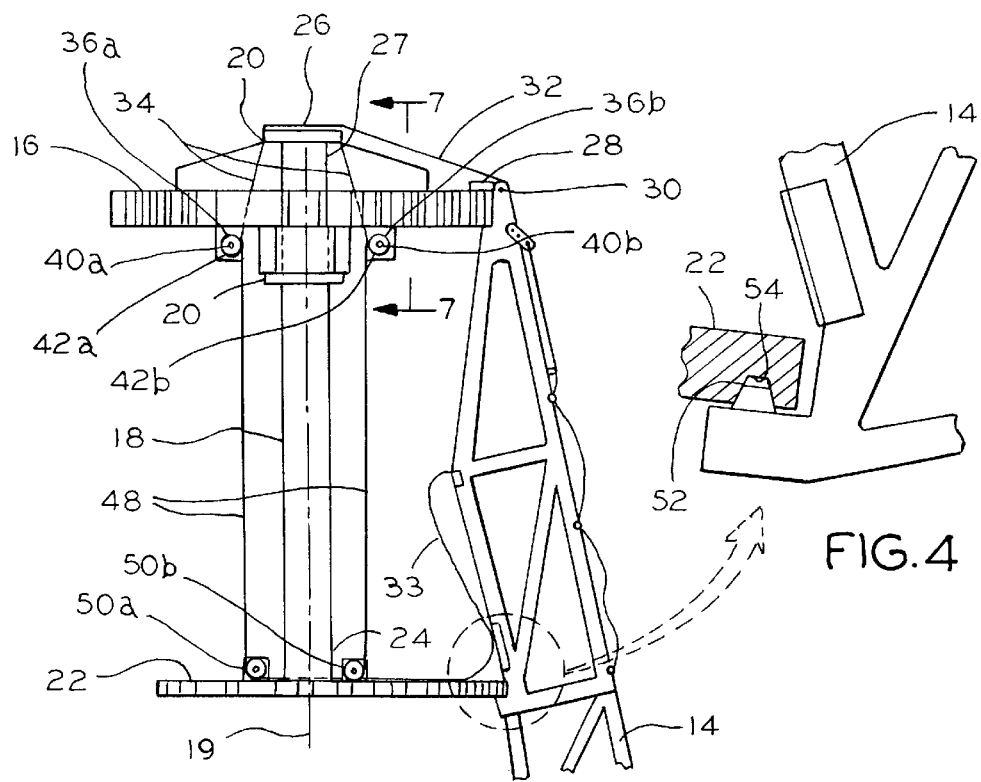
FIG. 3
FIG. 4

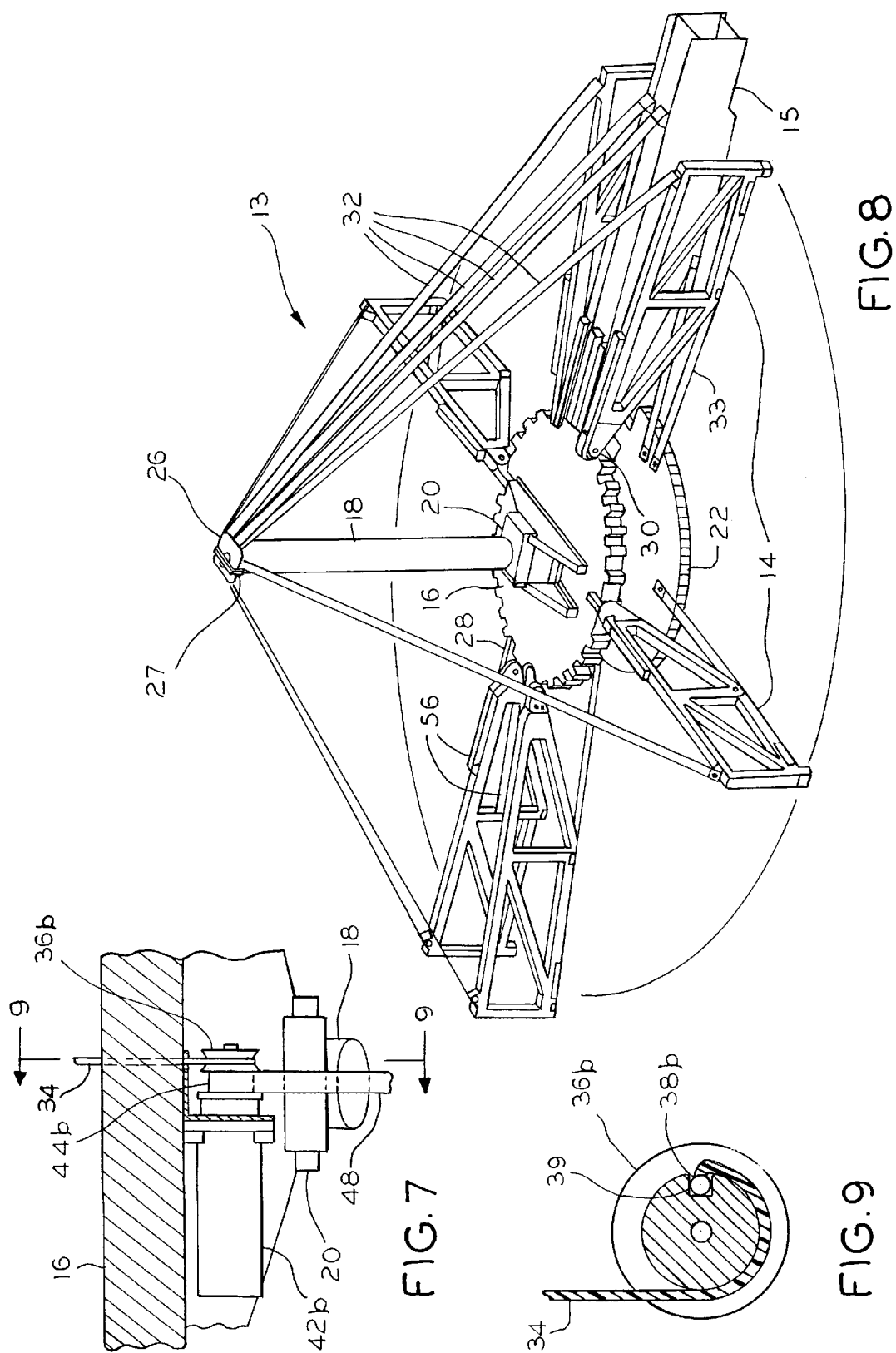

though not limited to graphite reinforced plastic composite material.

APPARATUS AND METHOD FOR COMBINED REDUNDANT DEPLOYMENT AND LAUNCH LOCKING OF DEPLOYABLE SATELLITE APPENDAGES

BACKGROUND OF THE INVENTION (a) Field of the Invention

The present invention relates generally to deployable structures, and specifically to systems for deploying satellite appendages such as reflectors for satellite antennae.

(b) Description of Related Art

Deployment systems for satellite appendages such as umbrella-type reflectors typically include a screw mechanism or a rack-and-pinion drive. Screw mechanisms employ a motor to rotate a metallic lead screw which rotation in turn drives a nut along the major axis of the lead screw. The nut is operatively connected to one or more structural members of the appendage such that movement of the nut causes the appendage to deploy.

Rack-and-pinion drives typically employ a motor to drive a pinion which in turn engages and moves a rack which meshes with the pinion. The rack is operatively connected to one or more structural members of the appendage such that movement of the rack causes the appendage to deploy.

Such screw mechanisms and rack-and-pinion drives have a number of disadvantages. There is potential for the screw mechanism or rack-and-pinion drive to jam, experience problems due to thermal expansion/contraction, or to exhibit unacceptable wear in use, resulting in improper deployment or a complete failure to deploy the appendage. Such potential problems make such mechanisms less reliable than might otherwise be desired.

Also, typical satellite appendages require a launch lock apparatus that relies on pyro-technic release devices. Such pyro-technic devices present safety and reliability problems and require additional electronics for the control and actuation thereof. Pyro-technic devices also require extensive design and testing efforts to ensure that the appendage structure can withstand loads associated with "pyro shock" and the resulting dynamic deployment motion which is difficult to analyze and/or simulate in a 1-G deployment environment (i.e. in a ground-based test). Pyrotechnics also require refurbishment after each use.

Accordingly, there is a need for a deployment system for satellite appendages that is configured so as to minimize or eliminate the aforementioned problems.

SUMMARY OF THE INVENTION

In accordance with one aspect of the present invention, an apparatus for deploying an appendage of a satellite is provided. The appendage includes a movable structural member that is movable from a stowed configuration to a deployed configuration. The deployment apparatus comprises an axially movable member having a major axis, and a central hub attached to the movable structural member and slidably attached to the axially movable member. The deployment apparatus further includes a flexible member connecting the central hub to the axially movable member, and a mechanism for tensioning the flexible member.

The tensioning mechanism may comprise a winding pulley that is driven by an electric motor. The axially movable member may include a cylindrical tube and a base plate, and the flexible member may pass around one or more guide pulleys mounted to the base plate.

The flexible member may be a flexible deployment strap, preferably made from KEVLAR® brand fabric material (available from E. I. Du Pont de Nemours and Company, 1007 Market Street, Wilmington, Del. 19898) and configured so as, when tensioned, to tend to move the axially movable member to the deployed configuration. Alternatively or additionally, the deployment apparatus includes a flexible launch lock cord adapted to tend to retain the axially movable member in the stowed configuration.

Preferably, the axially movable member includes a deployment tube that is constructed of a graphite reinforced plastic composite material.

In accordance with another aspect of the present invention, an apparatus for deploying an umbrella-like structure such as an antenna reflector is provided. The umbrella-like structure includes a plurality of rib members movable from a stowed configuration to a deployed configuration. The deployment apparatus comprises an axially movable member having a major axis and a central hub pivotally attached to the plurality of rib members and slidably attached to the axially movable member. The deployment apparatus further includes a flexible member connecting the central hub to the axially movable member and a mechanism for tensioning the flexible member.

The tensioning means may comprise a winding pulley that is driven by an electric motor. The axially movable member may include a cylindrical tube and a base plate, and the flexible member may pass around one or more guide pulleys mounted to the base plate.

The flexible member may be a flexible deployment strap, preferably made from KEVLAR® brand fabric material and configured so as, when tensioned, to tend to move the axially movable member to the deployed configuration. Alternatively or additionally, the deployment apparatus includes a flexible launch lock cord adapted to tend to retain at least one of the rib members in the stowed configuration.

Preferably, the axially movable member includes a deployment tube that is constructed of a graphite reinforced plastic composite material.

In accordance with yet another aspect of the present invention, an apparatus for deploying an umbrella-like structure such as an antenna reflector is provided. The umbrella-like structure includes a plurality of rib members movable from a stowed configuration to a deployed configuration. The deployment apparatus comprises an axially movable member having a major axis and a central hub pivotally attached to the plurality of rib members and slidably attached to the axially movable member. A flexible deployment strap, disposed on a first side of the central hub, connects the central hub to the axially movable member. A flexible launch lock cord, disposed on a second side of the central hub, connects the central hub to the axially movable member. The deployment apparatus further includes a mechanism for tensioning the flexible deployment strap and a mechanism for tensioning the launch lock cord.

In accordance with a still further aspect of the present invention, a method for deploying an umbrella-like structure, such as an antenna reflector, is provided. The umbrella-like structure includes a plurality of rib members movable from a stowed configuration to a deployed configuration. The method comprises the steps of providing an axially movable member having a major axis and providing a central hub pivotally attached to the plurality of rib members and slidably attached to the axially movable member. The method further comprises the steps of providing a flexible member connecting the central hub to the axially movable member and applying a tension load to the flexible member.

The deployment and launch lock method and apparatus in accordance with the present invention provides redundancy in that two motors are provided and the deployment and/or retention of the axially movable member can be achieved even if one of the motors is inoperative. The deployment and/or retention of the axially movable member in accordance with the present invention may be used to effect the deployment and/or retention of a linear translating member, such as a boom or a telescoping antenna. Alternatively, the deployment and/or retention of the axially movable member in accordance with the present invention may be used to effect the deployment and/or retention of other members, such as umbrella-type reflector rib members.

The apparatus in accordance with the present invention may be constructed primarily of materials, such as graphite fiber reinforced plastic (GFRP) materials and KEVLAR® brand fabric materials, that have an extremely low coefficient of thermal expansion, enhancing the on-station performance, as well as the repeatability of deployment, of the satellite appendage on which it is installed.

The invention itself, together with further objects and attendant advantages, will be best understood by reference to the following detailed description, taken in conjunction with the accompanying drawings.

BRIEF DESCRIPTION OF THE DRAWINGS

FIG. 2 is a side elevational view of the satellite of FIG. 1, depicting the antenna reflector in a deployed position;

FIG. 3 is an enlarged fragmentary side elevational view of the deployment apparatus in accordance with the present invention, showing part of a single rib member of the antenna reflector in the stowed configuration;

FIG. 4 is an enlarged fragmentary side elevational view of a portion of FIG. 3, partially in cross-section, showing a launch lock cone on one of the rib members and a mating launch lock indentation on a base plate portion of the deployment apparatus;

FIG. 7 is a fragmentary side elevational view, taken along lines 7—7 of FIG. 3, showing a deployment/locking drive stepper motor/gear head assembly in accordance with the present invention;

FIG. 8 is an isometric view of the deployment apparatus in a deployed configuration (for clarity, only structural elements associated with six of the ribs and the main rib are shown in FIG. 8); and FIG. 9 is a cross-sectional view, taken along lines 9—9 of FIG. 7, of a launch lock winding pulley in accordance with the present invention.

DESCRIPTION OF THE PREFERRED EMBODIMENTS

Figure 1:
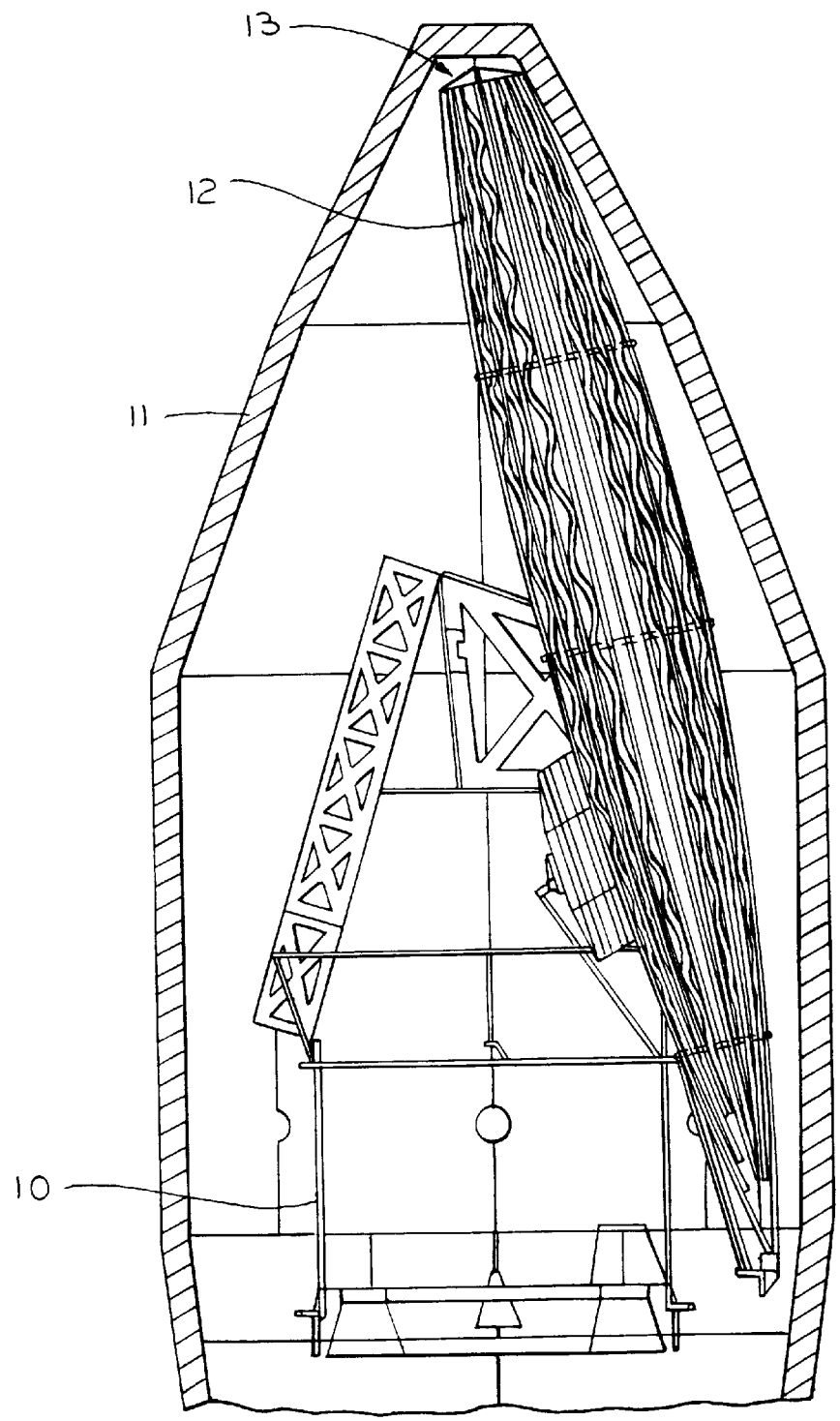
FIG. 1 is a side elevational view of a satellite having an antenna reflector including a deployment apparatus in accordance with the present invention, depicting the antenna reflector in a stowed position within a booster rocket fairing.

Referring initially to FIG. 1, a satellite 10 includes an umbrella-like antenna reflector assembly 12, shown in a stowed configuration in FIG. 1. In FIG. 1, the satellite 10 is shown stowed within a fairing 11 of a booster rocket (not shown).

FIG. 2 shows the antenna reflector assembly 12 in a deployed configuration, with a deployment apparatus 13 utilizing the present invention disposed generally in the center of the antenna reflector assembly 12. The antenna reflector assembly 12 includes a plurality of rib members 14 (for example, thirty of the rib members 14) and a main rib member 15.

Each rib member 14 is pivotally attached to a central hub 16, that is part of the deployment apparatus 13, and that is shown in greater detail in FIGS. 3 through 9. The main rib member 15 is pivotally attached at one end to the central hub 16 and is attached at an opposite end to an articulated arm 17 that secures the antenna reflector assembly 12 to the satellite 10.

The central hub 16 according to the present invention is slidably attached to a circularly cylindrical movable deployment tube 18, that is preferably constructed from graphite fiber reinforced plastic (GFRP) material (such as, for example, a material utilizing graphite cyanate ester resin), by means of a pair of journal bearings 20, preferably lined with VESPEL® brand material (available from E. I. Du Pont de Nemours and Company). The central hub 16 is adapted to remain substantially perpendicular to the major axis 19 of the deployment tube 18 as the deployment tube 18 moves relative to the central hub. Although the deployment tube 18 is shown to be circularly cylindrical in shape, having a major axis 19, another appropriate geometry (such as, for example, an I-beam or box-beam) could be substituted therefor as a suitable axially movable member.

The deployment tube 18 is rigidly attached to a base plate 22 at a first end 24 of the deployment tube 18. The deployment tube 18 is rigidly attached to a strap anchor plate 26 at a second end 27 of the deployment tube 18. The central hub 16 includes a plurality of rib attachment fittings 28, several of which are shown in FIG. 8. Each rib member 14 and the main rib member 15 is pivotally attached to one of the rib attachment fittings 28 by means of a pivot pin 30.

With further reference to FIGS. 3 through 9, the strap anchor plate 26 is connected to a plurality of upper rib straps 32, preferably made from a relatively pliant material (i.e. having a relatively low modulus of elasticity), such as low modulus GFRP, or KEVLAR® brand material, each attached to one of the rib members 14 and to the main rib member 15. The base plate 22 is connected to a plurality of lower rib straps 33, preferably made from a relatively stiff material (i.e. having a relatively high modulus of elasticity), such as GFRP. A launch lock cord 34, preferably made from a relatively pliant material, such as KEVLAR® brand material, fiberglass, or nylon, extends over the strap anchor plate 26.

When the antenna reflector assembly 12 is in the stowed configuration, the two ends of the launch lock cord are each wrapped around a launch lock cord winding pulley 36a and 36b, respectively. The lock cord winding pulleys 36a and 36b are identical to one another. Accordingly, only the lock cord winding pulley 36b is shown in FIG. 7. The ends of the launch lock cord 34 terminate in spherical beads 38a and 38b that are each engaged in a cylindrical bore 39 (FIG. 9) in each of the launch lock cord winding pulleys 36a and 36b. Accordingly, as each end of the launch lock cord 34 nearly completely unwinds from the respective launch lock cord winding pulley 36a or 36b, the spherical bead 38a or 38b will slide radially outwardly from the cylindrical bore 39.

Each launch lock cord winding pulley 36a, 36b is mounted to a drive shaft 40a and 40b, respectively, for rotation therewith. Each drive shaft 40a and 40b is driven by one of two electric deployment/locking drive stepper motor/gear head assemblies 42a and 42b, that each includes a multi-stage reduction gear head (not shown in detail).

Deployment strap winding pulleys 44a and 44b are also mounted to each drive shaft 40a and 40b, respectively, for rotation therewith. The deployment strap winding pulleys 44a and 44b are identical to one another. Accordingly, only the deployment strap winding pulley 44b is shown in FIG. 7. A deployment strap 48, preferably made from a relatively pliant material, such as KEVLAR® brand, fiberglass, or nylon fabric material, is securely anchored to and wound around each deployment strap winding pulley 44a and 44b, respectively, at either end of the deployment strap 48. As best seen in FIG. 3, the deployment strap 48 extends in a generally u-shaped path between the deployment strap winding pulleys 44a and 44b and passes around two guide pulleys, 50a and 50b, that are mounted to the base plate 22.

The deployment strap 48 is wound on the deployment strap winding pulleys 44a and 44b in a rotational direction opposite to the direction in which the ends of the launch lock cord 34 are wound around the launch lock winding pulleys 36a and 36b. Accordingly, as the deployment strap 48 is wound further onto the deployment strap winding pulleys, 44a and 44b, the launch lock cord 34 is loosened and, shortly thereafter, freed from the launch lock cord winding pulleys 36a and 36b.

Figure 5:
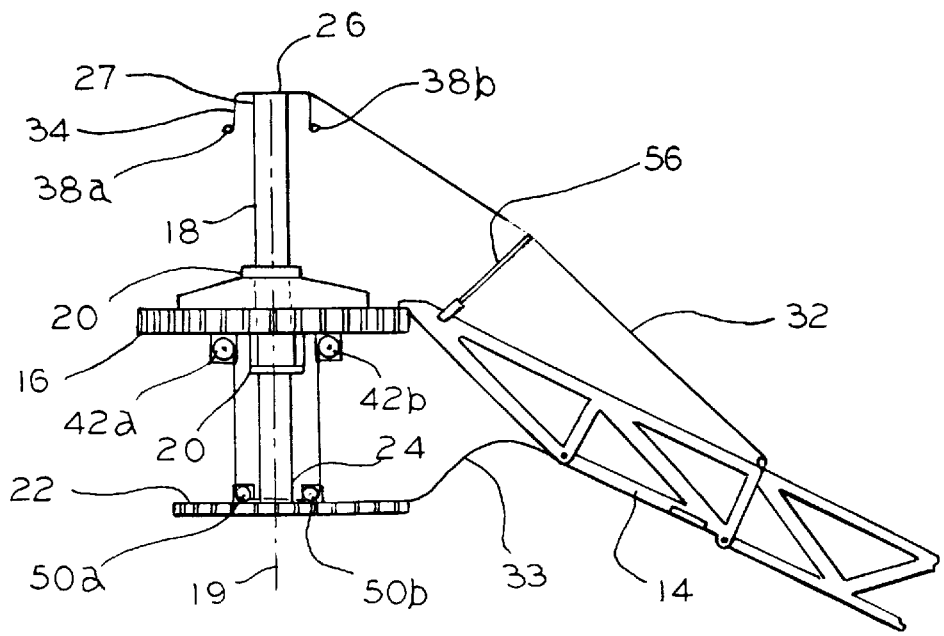
FIG. 5 is a fragmentary side elevational view, similar to that of FIG.3, showing part of a single rib member of the antenna reflector in a partially deployed configuration.

As the deployment strap 48 is wound still further and tensioned by the continued actuation of the electric deployment/locking drive stepper motor/gear head assemblies 42a and 42b, the deployment tube translates along the major axis 19 thereof, through the journal bearings 20 in the central hub 16, in an upward direction, as seen in FIG. 5, thereby creating tension in the upper rib straps 32. The tension in the upper rib straps 32 pulls deployment assist rods 56, each pivotally mounted at either end thereof to each rib member 14 (and to the main rib 15) and to each upper rib strap 32, away from respective rib member 14 and the main rib 15, thereby giving more leverage to the upper rib straps 32.

Figure 6:
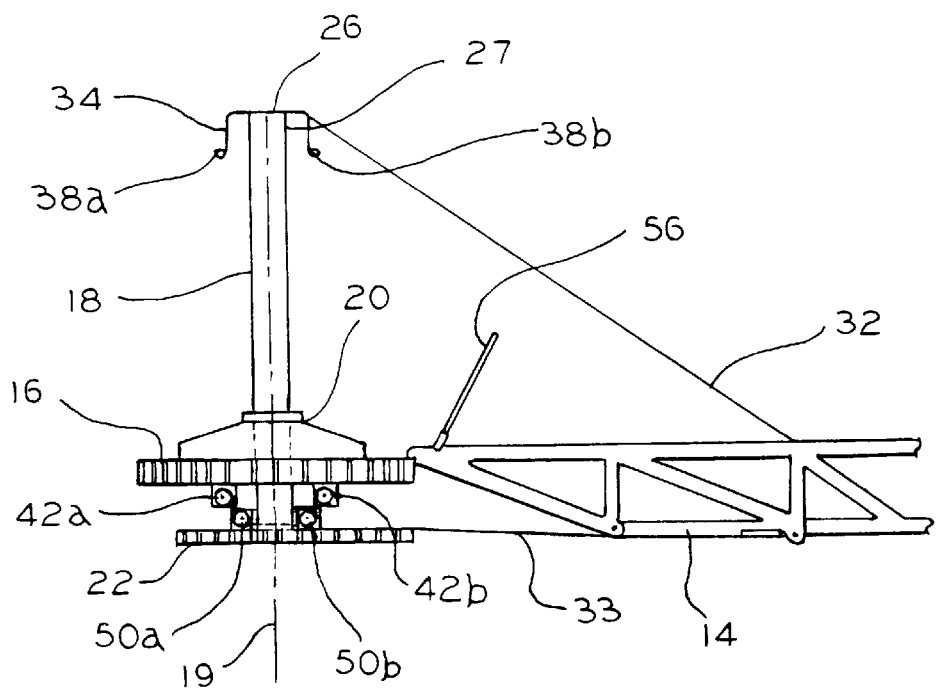
FIG. 6 is a view similar to FIG. 5, showing part of a single rib member of the antenna reflector in the deployed configuration.

Eventually, as the central hub 16 approaches a travel limit position along the deployment tube 18, the rib members 14 and the main rib 15 reach a fully deployed configuration, as shown in FIG. 6, at which point the lower rib straps 33 are taut and prevent further movement of the rib members 14 and the main rib 15.

The inherent magnetic detent characteristic of each of the electric deployment/locking drive stepper motor/gear head assemblies 42a and 42b maintains tension on the launch lock cord 34 when the antenna reflector assembly 12 is in the stowed configuration (i.e. during ground handling and launch). The tension in the launch lock cord 34 is less than that necessary in order to back drive the gear head assemblies 42a and 42b against the magnetic detent characteristic thereof, thereby making the launch lock cord 34 a passive reliable launch lock design.

When under tension in the stowed configuration, the launch lock cord 34 maintains the deployment tube 18 in the stowed configuration, in a downward position, as shown in FIG. 3. When the deployment tube 18 is in this downward position, a launch lock cone 52 on each rib member 14, best seen in FIG. 4, engages a corresponding launch lock indentation 54 in the base plate 22, thereby restraining each rib member 14 from movement away from the base plate 22.

Redundancy is built into the deployment apparatus 13. If either electric deployment/locking drive stepper motor/gear head assembly 42a or 42b should fail to operate, the antenna reflector assembly 12 will nevertheless deploy with minimal reduction in design margin. In such a failed motor scenario, the operational electric deployment/locking drive stepper motor/gear head assembly 42a or 42b will simply wind all of the necessary length of the deployment strap 48 onto the deployment strap winding pulley 44a or 44b associated with the operational electric deployment/locking drive stepper motor/gear head assembly 42a or 42b. The launch lock cord 34 will be released from the launch lock cord winding pulley 36a or 36b driven by the operational electric deployment/locking drive stepper motor/gear head assembly 42a or 42b, and will be free to slide over and off of the strap anchor plate 26. In the event of a motor failure, the launch lock cord 34 will remain attached to the launch lock cord winding pulley mounted to the failed electric deployment/locking drive stepper motor/gear head assembly 42a or 42b. However, the launch lock cord 34 will not impede successful deployment of the antenna reflector assembly 12.

The deployment strap 48 effects the motion of the base plate 22 by passing through the two guide pulleys 50a and 50b, attached to the base plate 22 and symmetrically disposed relative to the major axis 19 of the deployment tube 18. The resultant deployment force applied to the deployment tube 18 is substantially equal to twice the tensile load in the deployment strap 48 and directed substantially along the major axis 19 of the deployment tube 18, even if the system has only one motor or if one side of a two motor system is not operating.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention. For example, the guide pulleys 50a and 50b could be replaced by a single pulley (that would preferably have a diameter greater than that of the deployment tube 18).

What is claimed is:

1. An apparatus for deploying an appendage of a satellite, the appendage including an axially movable member having a major axis, the axially movable member being movable from a stowed configuration to a deployed configuration, the apparatus comprising:

a central hub slidably attached to the axially movable member;

at least one flexible member connecting the central hub to the axially movable member, the flexible member configured so as, when tensioned, to tend to move the axially movable member toward the deployed configuration; and means for tensioning the flexible member.

2. The apparatus of claim 1, wherein the tensioning means comprises a winding pulley.

3. The apparatus of claim 2, wherein the tensioning means further includes an electric motor for rotating the winding pulley.

4. The apparatus of claim 3, further including a second winding pulley and a second electric motor for rotating the second winding pulley.

5. The apparatus of claim 1, wherein the axially movable member includes a cylindrical tube.

6. The apparatus of claim 1, wherein the axially movable member includes a base plate and the flexible member passes around one or more guide pulleys mounted to the base plate.

7. The apparatus of claim 1, wherein the flexible member is further configured so as to apply a resultant force to the axially movable member that is substantially equal to at least twice the tensile load in the flexible member.

8. The apparatus of claim 1, wherein the flexible member is further configured so as to apply a resultant force to the axially movable member that is substantially along the major axis of the axially movable member.

9. The apparatus of claim 1, further including a flexible launch lock cord, adapted to be released through action of the tensioning means and that, when tensioned, is adapted to tend to retain the axially movable member in the stowed configuration.

10. The apparatus of claim 9, wherein the tensioning means is adapted to be capable of tensioning both the flexible member and the flexible launch lock cord.

11. The apparatus of claim 1, wherein the flexible member is a KEVLAR® brand fabric strap.

12. The apparatus of claim 1, wherein the axially movable member includes a deployment tube that is constructed of a graphite reinforced plastic composite material.

13. An apparatus for deploying an umbrella-like structure such as an antenna reflector, the umbrella-like structure including a plurality of rib members movable to convert the umbrella-like structure from a stowed configuration to a deployed configuration, comprising:
   an axially movable member having a major axis and movable from the stowed configuration toward the deployed configuration;
   a central hub pivotally attached to the plurality of rib members and slidably attached to the axially movable member;
   at least one flexible member connecting the central hub to the axially movable member, the flexible member configured so as, when tensioned, to tend to move the axially movable member toward the deployed configuration; and
   means for tensioning the flexible member.

14. The apparatus of claim 13, wherein the tensioning means comprises a winding pulley.

15. The apparatus of claim 14, wherein the tensioning means further includes an electric motor for rotating the winding pulley.

16. The apparatus of claim 15, further including a second winding pulley and a second electric motor for rotating the second winding pulley.

17. The apparatus of claim 13, wherein the axially movable member includes a cylindrical tube.

18. The apparatus of claim 13, wherein the axially movable member includes a base plate and the flexible member passes around one or more guide pulleys mounted to the base plate.

19. The apparatus of claim 13, wherein the flexible member is a flexible deployment strap configured so as, when tensioned, the flexible deployment strap tends to move at least one of the rib members toward the deployed configuration.

20. The apparatus of claim 19, wherein the flexible deployment strap is further configured so as to apply a resultant force to the axially movable member that is substantially equal to at least twice the tensile load in the flexible deployment strap.

21. The apparatus of claim 19, wherein the flexible deployment strap is further configured so as to apply a resultant force to the axially movable member that is substantially along the major axis of the axially movable member.

22. The apparatus of claim 19, further including a flexible launch lock cord, adapted to be released through action of the tensioning means and that, when tensioned, is adapted to tend to retain the axially movable member in the stowed configuration.

23. The apparatus of claim 22, wherein the tensioning means is adapted to be capable of tensioning both the flexible deployment strap and the flexible launch lock cord.

24. The apparatus of claim 13, wherein the flexible member is a fabric strap.

25. The apparatus of claim 13, wherein the axially movable member includes a deployment tube that is constructed of a graphite reinforced plastic composite material.

26. An apparatus for deploying an appendage of a satellite, the appendage including an axially movable member having a major axis, the axially movable member being movable from a stowed configuration to a deployed configuration, the apparatus comprising:
   a central hub slidably attached to the axially movable member;
   at least one flexible member connecting the central hub to the axially movable member, the flexible member configured so as, when tensioned, the flexible member is adapted to tend to retain the axially movable member in the stowed configuration; and
   means for tensioning the flexible member;
   wherein, the tensioning means is adapted to be capable of releasing the flexible member.

27. The apparatus of claim 26, wherein the flexible member includes an end portion and the tensioning means includes a bore adapted to receive the end portion of the flexible member.

28. The apparatus of claim 26, wherein the tensioning means includes a pulley and a portion of the flexible member is wound around the pulley when the axially movable member is in the stowed configuration.

29. The apparatus of claim 28, wherein the flexible member includes an end portion and the pulley includes a bore adapted to receive the end portion of the flexible member.

30. An apparatus for deploying an umbrella-like structure such as an antenna reflector, the umbrella-like structure including a plurality of rib members movable from a stowed configuration to a deployed configuration, comprising:
   an axially movable member having a major axis;
   a central hub pivotally attached to the plurality of rib members and slidably attached to the axially movable member;
   a flexible deployment strap, disposed on a first side of the central hub, connecting the central hub to the axially movable member;
   a flexible launch lock cord, disposed on a second side of the central hub, connecting the central hub to the axially movable member when at least one of the plurality of rib members is in the stowed configuration;
   means for tensioning the flexible deployment strap; and
   means for tensioning the launch lock cord.

31. A method for deploying an umbrella-like structure such as an antenna reflector, the umbrella-like structure including a plurality of rib members movable from a stowed configuration to a deployed configuration, the method comprising the steps of:
   providing an axially movable member having a major axis;
   providing a central hub pivotally attached to the plurality of rib members and slidably attached to the axially movable member;

providing a flexible member connecting the central hub to the axially movable member; and applying a tension load to the flexible member to move the axially movable member to thereby move at least one of the plurality of rib members toward the deployed configuration.

32. The method of claim 31, wherein the step of applying a tension load to the flexible member includes a step of shortening the effective length of the flexible strap disposed between the central hub and the axially movable member.

33. The method of claim 32, wherein a winding pulley is pivotally mounted to the central hub and the step of shortening the length of the flexible strap includes a step of winding the flexible strap onto the winding pulley.

* * * * *